United States Patent
Hammer

[11] 3,912,36
[45] Oct. 14, 197

[54] OPTICAL FIBER TO PLANAR WAVEGUIDE COUPLER

[75] Inventor: Jacob Meyer Hammer, Trenton, N.J.

[73] Assignee: RCA Corporation, New York, N.Y.

[22] Filed: Jan. 29, 1974

[21] Appl. No.: 437,690

[52] U.S. Cl. ....... 350/96 C; 350/96 WG; 350/162 R
[51] Int. Cl.² .......................................... G02B 5/14
[58] Field of Search ..................... 350/96 WG, 96 C

[56] References Cited
UNITED STATES PATENTS

| | | | |
|---|---|---|---|
| 3,674,336 | 7/1972 | Kogelnik | 350/96 WG |
| 3,674,337 | 7/1972 | Marcatili | 350/96 WG |

OTHER PUBLICATIONS

Ash et al., "Interconnection of Optical Fibers to Pl nar Optical Integrated Circuitry" IBM Technical D closure Bulletin, Vol. 13, No. 9, Feb. 1971, p 2529–2530.

*Primary Examiner*—John K. Corbin
*Attorney, Agent, or Firm*—Edward J. Norton; Georg J. Seligsohn

[57] ABSTRACT

Optical coupling between a fibre-optic waveguide a a planar optic waveguide is achieved by providii techniques for phase matching intercoupled evane cent fields of light wave energy traveling respective in the two types of waveguides.

3 Claims, 8 Drawing Figures

OPTICAL FIBER TO PLANAR WAVEGUIDE COUPLER

This invention relates to optical couplers and, more particularly, to optical couplers for coupling light between a fibre-optic and a planar waveguide.

The recent development of low-loss fibre-optic waveguides has brought wide bandwidth optical communication systems much closer to realization. In such systems, one or more channels of information signals modulate a coherent light wave energy carrier. An optical communication network making use of modulated light wave energy involves a plurality of separated groups of optical processing elements which are coupled to each other by means of fibre-optic transmission lines.

Many types of optical processing, such as switching, modulation, etc., are normally accomplished within planar optical waveguides (see, by way of example, allowed copending United States Patent application Ser. No. 255,660, filed May 22, 1972 by Channin and assigned to the same assignee as the present application). It, therefore, becomes necessary to provide practical means for coupling light wave energy between planar optical waveguides and fibre-optic elements. The present invention is directed to relatively simple and efficient techniques for optically coupling light wave energy between a planar optical waveguide and a fibre-optic element.

This and other features and advantages of the present invention will become more apparent from the following detailed description taken together with the accompanying drawing, in which:

FIG. 4b is an enlarged section view taken through section A'—A of FIG. 4a, and

The light-coupling provided by the approaches shown respectively in the embodiment of FIGS. 1a and 1b, FIG. 2, FIG. 3 and FIGS. 4a and 4b all make use of the evanescent electromagnetic fields of the light traveling in the fibre-optic and the planar optic waveguide. As in any case of evanescent field coupling, strong coupling only takes place if the phase velocities of the coupling fields are matched. Thus, the problem is to provide an arrangement which results in the phase velocities of the coupling fields being matched.

Figure 1A:
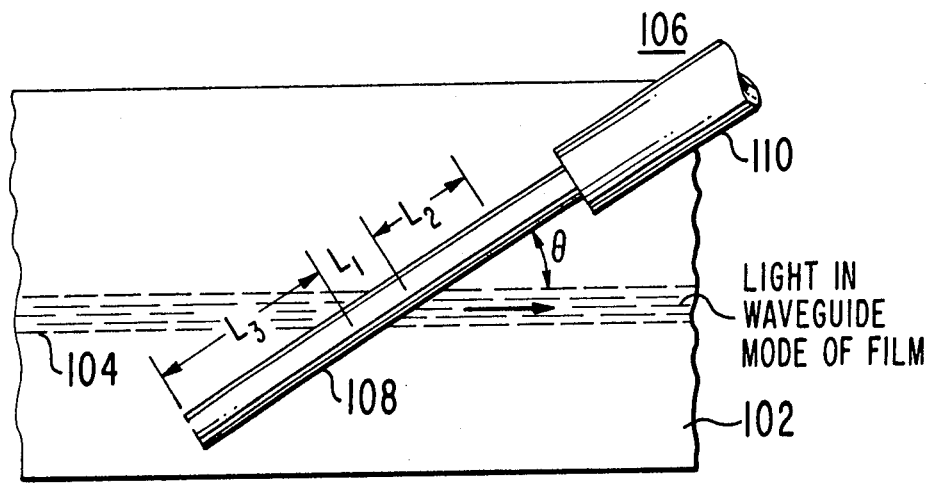
FIGS. 1a and 1b are respectively a top view and a side view of a first embodiment for directly coupling a planar optic waveguide to a fibre-optic element.
Figure 1B:
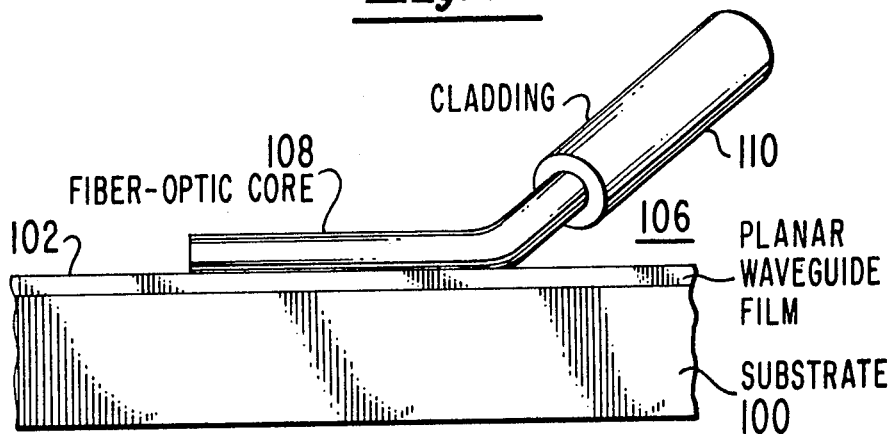

Specifically, as shown in FIGS. 1a and 1b, the planar optic waveguide comprises a substrate 100 supporting a planar optic waveguide thereon in the form of planar film 102. Planar film 102 may be composed of glass, an electro-optic crystal, etc. and substrate 100 may be composed of any dielectric, such as glass or optic crystal, having a lower index of refraction than planar film 102 at the interface therebetween. As shown in FIG. 1a, in operation, planar film 102 has a beam of light wave energy 104 traveling through a region thereof in a predetermined direction (horizontally from left to right). The light wave energy of light beam 104 is substantially at a predetermined wavelength, and is traveling in a predetermined planar mode at a velocity inversely proportional to the effective refractive index of film 102 for the particular mode considered. Where highly coherent light is desirable, the degree of coherency required is controlled by the range of frequencies accepted by the given modes being coupled. For the purposes of this disclosure, light meeting this requirement is defined as "quasi-coherent."

Fibre-optic 106, which is composed of a relatively high index of refraction core 108 covered by a relatively low index of refraction cladding 110, has the cladding 110 thereof removed from its termination (the surrounding air providing the relatively low index of refraction therefor), so that the terminating end of core 108 may be bent to provide a length thereof in close proximity (substantially direct contact) with planar waveguide film 102 at least in the longitudinal portion $L_1$ thereof, which is cooperatively situated with respect to the region of planar film 102 through which light beam 104 is traveling. Alternatively, a fibre-optic composed entirely of a core, without any cladding, could substituted for fibre-optic 106.

As shown in FIG. 1a, the length of core 108 in close proximity to film 102 is oriented at an angle $\theta$ with respect to the direction (horizontal) of the region of planar film 102 through which light beam 104 is traveling. Thus, as shown in FIG. 1a, there may be longitudinal portions $L_2$ and $L_3$ of the terminating portion of core 108 in close proximity to thin film 102 which are respectively above and below the region of film 102 which light beam 104 is traveling. Any light wave energy in core 108 travels for the particular non-planar mode considered at a velocity inversely proportional to its effective index of refraction $n_2$.

As stated earlier, strong evanescent field coupling only takes place between light wave energy 104 traveling in planar waveguide film 102 and core 108 of fibre-optic 106 when the respective phase velocities of light wave energy in planar waveguide film 102 and core 108 of fibre-optic 106 are matched. In particular, if the propagation vector in planar waveguide film 102 is $k_1$ and the propagation vector in core 108 of fibre-optic 106 is $k_2$, for strong evanescent field coupling to take place:

$$k_1 \cos \theta = k_2.$$

However, $$k_1 = 2\pi n_1/\lambda_0;$$

$$k_2 = 2\pi n_2/\lambda_0;$$

where $\lambda_0$ is the free space wavelength.

By substitution of equations (2) and (3) in equation (1), it is found that $$\cos \theta = n_2/n_1. \quad 4)$$

This can be satisfied so long as $$n_2 \leq n_1.$$

Although phase match is essential for coupling to take place, the amount of coupling which takes place depends also on such factors as the mode polarization, the length of the region $L_1$ and the actual distance between core 108 and the planar waveguide film 102. In the most usual case, where it is desired that a minimum of light wave energy couple back from fibre-optic 106 to planar optic waveguide film 102, the length of portions $L_2$ and $L_3$ which are in close proximity (substantially direct contact) with the surface of planar waveguide film 102 in regions thereof outside of the region in which light beam 104 is traveling, should be made as close to zero as possible.

In order to achieve the required close proximity between planar waveguide film 102 and the end portion of fibre-optic core 108, fibre-optic core 108 may be pressed with a shaped clamp against planar waveguide film 102 or they may be cemented with various optically transparent cements, ceramics or glasses. Further, on occasion, it may be desirable to use cements with various degrees of opacity.

Figure 2:
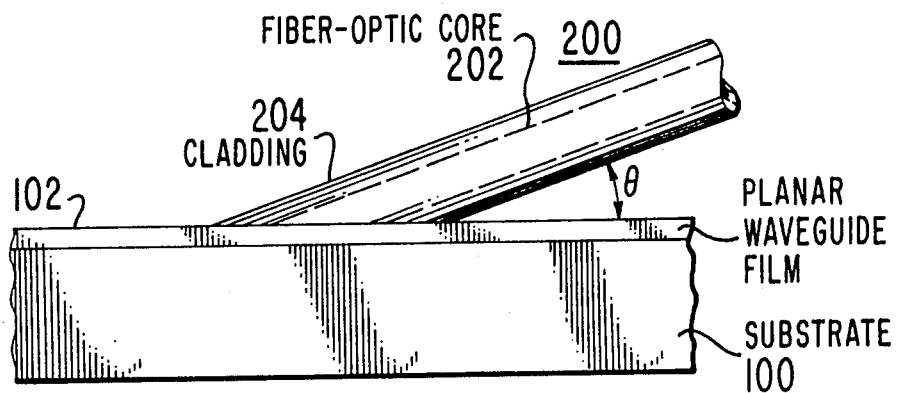
FIG. 2 shows a second embodiment for directly coupling a planar optic waveguide to a fibre-optic element.

FIG. 2 considers the case of a fibre-optic with an end cut on an angle $\theta$. Specifically, the embodiment shown in FIG. 2 structurally differs from that shown in FIGS. 1a and 1b in that the angle $\theta$ in FIG. 2 lies in the vertical plane, rather than the horizontal plane. Thus, in FIG. 2, fibre-optic 200, composed of core 202 covered by cladding 204 is oriented obliquely at the angle $\theta$ with respect to the horizontal surface of planar film 102. If a component of light is traveling in a non-planar mode in fibre-optic 200, and the effective index of refraction of fibre-optic 200 for this mode is $n_2$, for strong coupling to take place to a planar mode within planar film 102, if planar film 102 has an index of refraction $n_1$ the relationship between the wave vector $k_1$ in planar film 102 and the wave vector $k_2$ in fibre-optic 200 is:

$$k_1 = k_2 \cos \theta. \tag{5}$$

By substitution of equations (2) and (3) in equation (5), it is found that in FIG. 2

$$\cos \theta = n_1/n_2. \tag{6}$$

Figure 3:
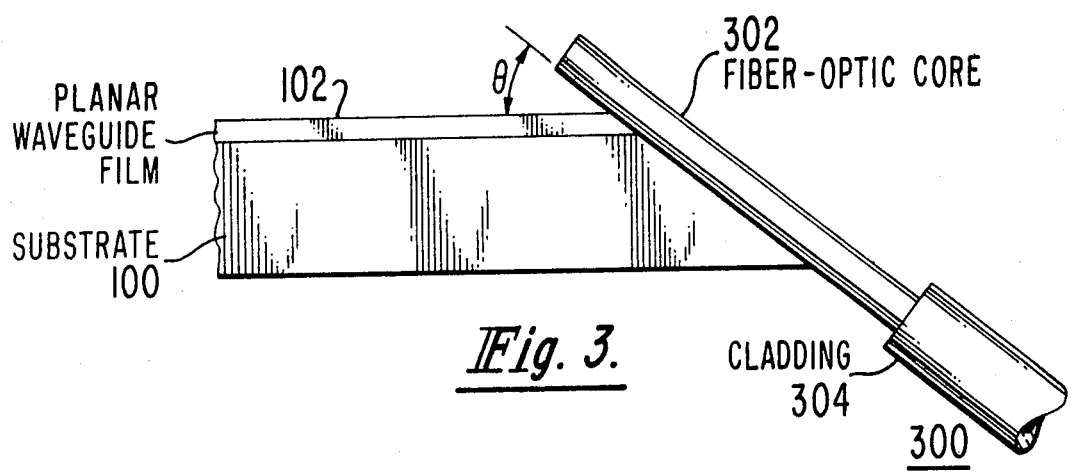
FIG. 3 shows a third embodiment for directly coupling a planar optic waveguide to a fibre-optic element.

A third geometry is shown in FIG. 3 where fibre-optic 300 has its core 302 in close proximity to the edge of planar film 102 and is oriented at an angle $\theta$ with respect to the surface of planar film 102. Thus, as shown in FIG. 3, cladding 304 is removed from the terminating end of fibre-optic 300.

In the case of FIG. 3, employing the same notation employed for FIGS. 1 and 2, $$k_2 = k_1 \cos \theta. \tag{7}$$

By substitution of equation (2) and (3) in equation (7)

$$\cos \theta = n_2/n_1. \tag{8}$$

Thus, in the arrangement shown in FIGS. 1a and 1b and FIG. 3, strong coupling can be achieved by making the index of refraction $n_1$ of the planar optic waveguide film greater than the index of refraction $n_2$ of the fibre-optic core 102 and then orienting the end of the fibre-optic core with respect to the film, in the manner shown in either FIGS. 1 or 3, at that angle $\theta$ which satisfies the relationship shown both in equation (4) and (8). In the case of the arrangement shown in FIG. 2, the index of refraction of the fibre-optic core 202 must be made larger than the index of refraction of the planar optic waveguide film 102 in order to satisfy equation (6).

Thus, the arrangements of FIGS. 1a and 1b, FIG. 2 and FIG. 3 provide efficient coupling of coherent light wave energy by overlapping the evanescent fields of the light wave energy in fibre-optic and planar optical waveguides. In any given case, where the planar optic film and the fibre-optic have respective predetermined indices of refraction, the geometric relationship which results in strong light coupling between the fibre-optic and the planar waveguide film in each of FIGS. 1a and 1b, 2 and 3, is constrained by the need to conform with equations (4), (6) or (8). This constraint in the arrangement of FIGS. 1a and 1b, 2 and 3, which all employ substantially direct contact between the fibre-optic and the planar waveguide film is removed in the arrangement shown in FIGS. 4a and 4b, wherein a diffraction grating is inserted between the coupled fibre-optic and planar optic film.

Figure 4A:
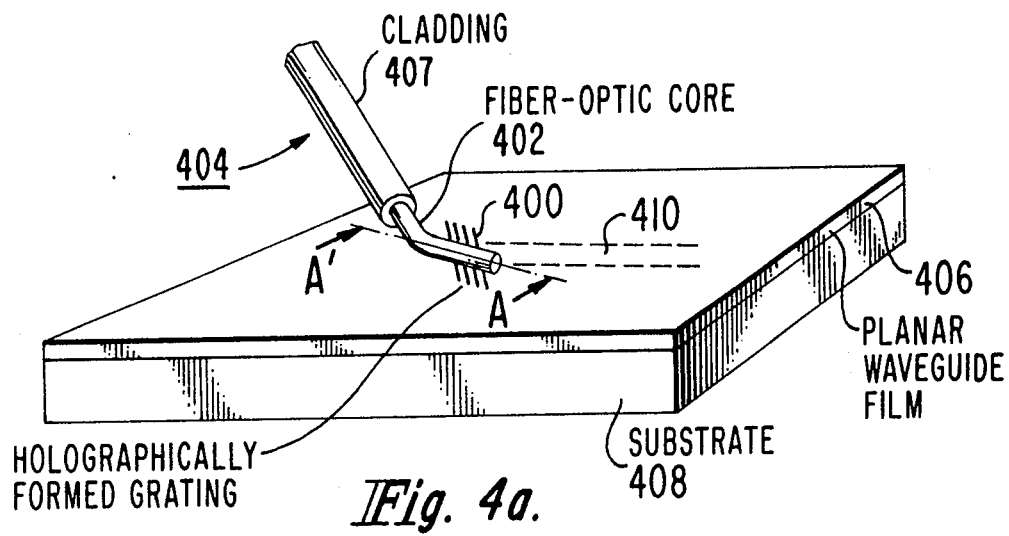
FIG. 4a shows a first embodiment for coupling a planar optic waveguide to a fibre-optic element through a diffraction grating.

Referring now to FIG. 4a, there is shown an arrangement similar to that shown in FIGS. 1a and 1b, except for the fact that a diffraction grating 400 is sandwiched between the exposed terminating end of fibre-core 402 of fibre-optic 404 and the surface of planar optical waveguide 406. Fibre-optic 402 is covered by fibre-cladding 407 except for the exposed terminating end thereof.

Diffraction grating 400 may be produced by covering a portion of the surface of planar waveguide 406 with a photoresist, then holographically exposing the photoresist and developing it.

Figure 4B:
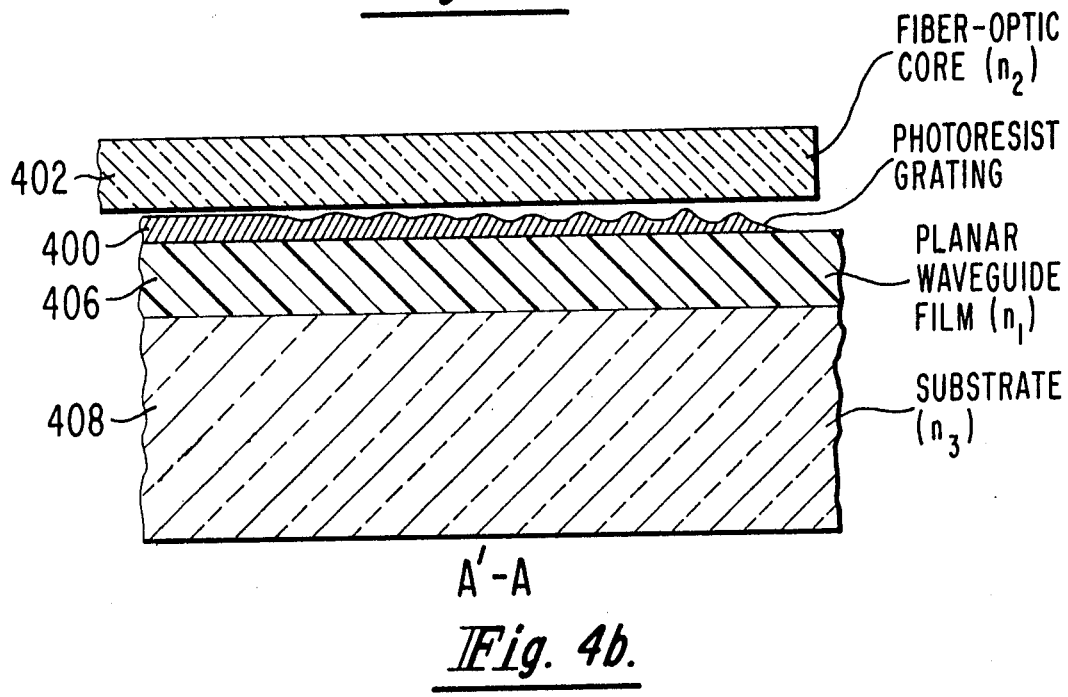

As shown in the enlarged section of FIG. 4b, the planar waveguide 406 is disposed on a substrate 408 and the photoresist grating 400 is disposed between fibre-optic core 402 and the planar waveguide 406. By using focused Gausian beams in the holography recording interferometer, the grating depth of photoresist grating 400 can be varied in an exponential manner, as shown in FIG. 4b. The line spacing of the photoresist diffraction grating 400 is determined by the wavelength of the radiation exposing the photoresist and by the adjustment of the angle between the two interfering beams, as known in holography.

Another way a diffraction grating can be produced in the surface of planar waveguide 406 is by ion or electron beam milling or, alternatively, by the holographic interference between coherent light coupled into the guide by a prism and other coherent light focused into the optic-fibre to thereby form the grating in a light-sensitive plastic in which the optic-fibre and a portion of the planar waveguide are included.

The use of a diffraction grating, such as shown in FIGS. 4a and 4b, makes it possible to provide strong coupling by evanescent fields between planar waveguide 406, having a first certain predetermined index of refraction $n_1$, and a fibre-optic core 402 having a second predetermined index of refraction $n_2$, in which the angle $\theta$ between the longitudinal direction of the coupling end of core 402 and the direction of light traveling in region 410 of planar optical waveguide 406 is independent of the constraint of equation (4) of FIGS. 1a and 1b. Specifically, by properly choosing the line spacing of diffraction grating 400 and its orientation with respect to the light traveling in region 410, the constraints in the relationship between the angle $\theta$ and the indices of refraction $n_1$ and $n_2$, respectively, are substantially removed.

Figure 5A:
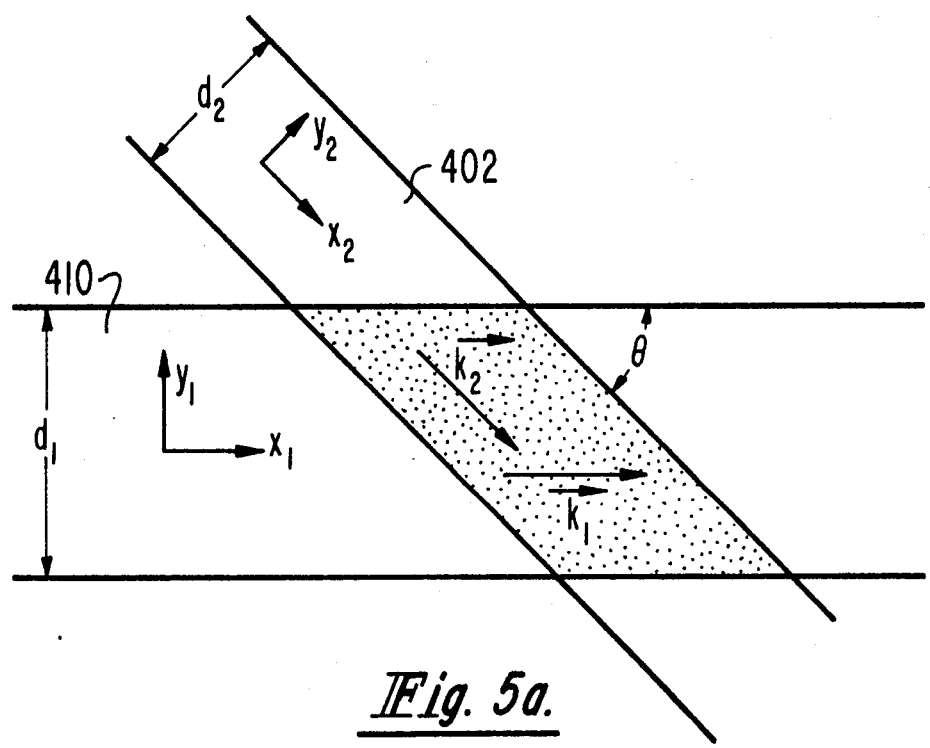
FIGS. 5a and 5b are diagrams helpful in explaining the design of the embodiment shown in FIGS. 4a and 4b.

FIG. 5a shows the geometric relationship between the terminating end of fibre-core 402 and the region 410 of planar optical waveguide 406 in which coherent light is traveling. Specifically, region 410 has an effective optic waveguide width $d_1$ parallel to ordinate $y_1$ and provides a planar waveguide for light traveling in a direction parallel to abscissa $x_1$. The wave propagation vector of the light traveling in region 410 is $k_1$. Similarly, the terminating end of fibre-optic core 402 provides an effective optic waveguide width $d_2$ parallel to ordinate $y_2$ for light traveling in a direction parallel to abscissa $x_2$. The wave propagation vector of light traveling in fibre-optic core 402 is $k_2$. The terminating end of fibre-optic core 402 is oriented at an angle $\theta$ with respect to planar optic waveguide region 410, so that the stipled area of FIG. 5a represents the overlapping portions of fibre-optic core 402 and region 410 where it is desired that strong light coupling take place between light wave energy in planar optic waveguide region 410 and fibre-optic core 402. This strong coupling of light wave energy depends on the occurrence of a phase match which, in turn, depends upon the respective value of the index of refraction $n_1$ of planar optic waveguide region 410, the index of refraction $n_2$ of fibre-optic core 402, the spacing S of the diffraction grating 400 and the orientation of the diffraction grating 400 with respect to the planar optics waveguide region 410 and fibre-optic core 402. The relationship between these factors is shown in the vector diagram of FIG. 5b.

Figure 5B:
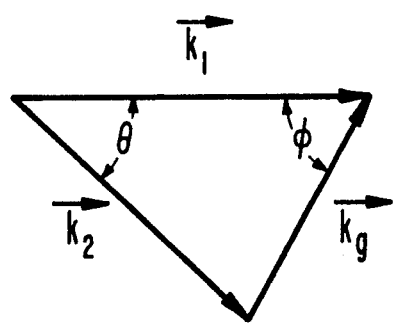

Referring now to FIG. 5b, for phase match to occur, the diffraction grating 400 must provide an effective wave propagation vector $k_g$ having a value which, when vectorially added to the value of wave propagation vector $k_2$, is equal to the value of wave propagation vector $k_1$. Thus, if the wave propagation vectors $k_1$ and $k_2$, which are oriented at an angle $\theta$ with respect to each other, have the relative magnitudes shown in FIG. 5b, the diffraction-grating wave propagation vector $k_g$ required to provide phase match has the relative magnitude shown in FIG. 5b and is oriented at angle $\phi$ with respect to vector $k_1$ shown in FIG. 5b.

It can be mathematically shown that the proper diffraction grating spacing S and the proper orientation angle $\phi$ of the diffraction grating to provide this wave propagation vector for phase match are given by the following equations:

$$S = \frac{\lambda_0}{n_2 \sin\theta} \sin\left[\arctan\left(\frac{n_2 \sin\theta}{n_1 - n_2\cos\theta}\right)\right] \quad (9)$$

where $\lambda_0$ is the free space wavelength, and $$\phi = \arctan\left(\frac{n_1 \sin\theta}{n_2 - n_1\cos\theta}\right) \quad (10)$$

Although phase matching is independent of the de of the diffraction grating, the value of the coupling efficient depends upon this depth. Thus, assuming coherent light wave energy is traveling from lefı right in planar waveguide 406, the exponential v: tion in the depth of grating 400, shown in FIG. 4b, vides a relatively low coupling coefficient for the ı tively high-intensity light wave energy which e: toward the left of planar waveguide 406, but prov a relatively high coupling coefficient for the relati low-intensity light wave energy which exists toward right end thereof.

Although the depth of diffraction grating 400 v: exponentially in the preferred embodiment show FIG. 4b, to thereby provide a exponentially var coupling coefficient, the present invention cont plates both a diffraction grating whose depth anc sulting value of coupling coefficient does not vary ε or one which varies from left-to-right in some o manner, such as linearly for instance.

The choice of the coupling variation and $d_1$ is n to yield a beam in the planar waveguide of a desirec tent in the $y_1$ direction with a desired energy distr tion when light is to be coupled from the fibre to planar guide. In the reverse case the choices are n to ensure maximum coupling from a given planar b to the particular fibre.

What is claimed is:

1. An optical coupler for given light wave en which is at least quasi-coherent, said coupler comµ ing:

a. a planar optical waveguide including a longituc region having a first effective optic waveg width $d_1$ for propagating said given light wave ergy along said longitudinal region thereof wi first propagation vector $k_1$ determined by the iı of refraction $n_1$ of said planar optical waveg and the free space wavelength $\lambda_0$ of said given wave energy, b. a fibre-optic waveguide incorporating a core ing a second effective optic waveguide width $d$ propagating said given light wave energy in fibre-optic waveguide with a second given prop tion vector $k_2$ determined by the index of refrac $n_2$ of said core and the free space wavelength , said given light wave energy, $n_2$ being diffe from $n_1$, the surface of a longitudinal portio said core being inclined at a given oblique anµ with respect to the length of said longitudina gion of said planar optical waveguide with a sur of said core in sufficient overlapping proximiı a given area of said longitudinal region of said nar optical waveguide to permit the intercouµ of only substantially phase-matched evanes fields of said given light wave energy over given area, said given area being defined by $\epsilon$ and $\theta$, and c. a dielectric line grating sandwiched between overlapping proximate surface of said core and given area of said longitudinal region of said pl optical waveguide, the lines of said grating ha a line spacing S and being oriented at a se angle $\phi$ with respect to the length of said longi nal region of said planar optical waveg wherein $$S = \frac{\lambda_0}{n_2 \sin \theta} \sin \left[ \arc \tan \left( \frac{n_2 \sin \theta}{n_1 - n_2 \cos \theta} \right) \right]$$

and $$\phi = \arc \tan \left( \frac{n_1 \sin \theta}{n_2 - n_1 \cos \theta} \right)$$

2. The optical coupler defined in claim 1, wherein the depth of the lines of said grating varies from one end of said grating to the other end of said grating in accordance with a predetermined function.

3. The optical coupler defined in claim 2, wherein said predetermined function is an exponential function.

* * * * *

UNITED STATES PATENT OFFICE
CERTIFICATE OF CORRECTION

PATENT NO. : 3,912,363

DATED : October 14, 1975

INVENTOR(S) : Jacob Meyer Hammer

It is certified that error appears in the above-identified patent and that said Letters Patent are hereby corrected as shown below:

Column 2, line 65, after "$n_1$." delete "4)" and insert at end of line--(4)--

Column 5, line 60, equation 9, after ")" insert --]--

Column 6, line 15, change "a" to --an--

Column 7, line 1, after ")" insert --]--

Signed and Sealed this twenty-third Day of March 1976

[SEAL]

Attest:

RUTH C. MASON
*Attesting Officer*

C. MARSHALL DANN
*Commissioner of Patents and Trademarks*